United States Patent [19]

Mathison

[11] Patent Number: 4,691,728
[45] Date of Patent: Sep. 8, 1987

[54] ELECTRONIC TEST AND SEAL APPARATUS AND METHOD
[75] Inventor: Allen D. Mathison, Richfield, Minn.
[73] Assignee: Cherne Industries, Inc., Minneapolis, Minn.
[21] Appl. No.: 868,129
[22] Filed: May 28, 1986
[51] Int. Cl.[4] .................... F16K 43/00; F16L 55/16; F16L 55/18
[52] U.S. Cl. ........................................ 137/15; 71/65; 73/40.5 R; 137/315; 137/355.12; 137/355.17; 137/355.27; 138/90; 138/93; 138/97; 239/197; 239/743; 364/507; 364/510
[58] Field of Search .................. 71/65; 73/49.5, 49.6, 73/49.7, 49.8, 40.5 R; 137/15, 315, 355.12, 355.17, 355.2, 355.26, 355.27; 138/40, 93, 97; 134/24; 239/188, 189, 195, 197, 198, 199; 364/507, 510

[56] References Cited
U.S. PATENT DOCUMENTS

| | | | |
|---|---|---|---|
| 3,021,888 | 2/1962 | Marinovich | 73/49.6 |
| 3,430,485 | 3/1969 | Henry | 73/49.6 |
| 3,453,869 | 7/1969 | Cherne | 73/40.5 R |
| 3,534,587 | 10/1970 | Grenci | 73/49.8 |
| 3,665,966 | 5/1972 | Ver Nooy | 73/49.6 |
| 3,711,689 | 1/1973 | Park | 73/40.5 R |
| 3,750,711 | 8/1973 | Conklin et al. | 73/40.5 R |
| 3,834,422 | 9/1974 | Larson | 138/97 |
| 3,915,197 | 10/1975 | Piccirilli | 138/97 |
| 3,966,088 | 6/1976 | Reynolds | 73/40.5 R |
| 4,417,465 | 11/1983 | Noe et al. | 73/40.5 R |
| 4,441,561 | 4/1984 | Garmong | 138/93 |
| 4,470,946 | 9/1984 | Vassalotti | 138/90 |
| 4,572,228 | 2/1986 | Larson et al. | 137/315 |
| 4,586,142 | 4/1986 | Cota et al. | 73/40.5 R |

OTHER PUBLICATIONS

Cherne Industries, Inc., Operation & Maintenance Manual—Automatic Test and Seal System, May 1984.

Primary Examiner—George L. Walton
Attorney, Agent, or Firm—Anthony G. Eggink

[57] ABSTRACT

An automatic pipeline testing and sealing system and method to operate the functions of an inflatable packer device from a remote location. The automatically operated packer device has inflatable end elements, an exterior sleeve member and a chemical dispensing mechanism and is in operative communication with a cable assembly, a compressed air source, a pressurized test fluid source, a sealing chemical component source, and a catalyst component source. The automatic testing and sealing system comprises a first pump in operative communication with the sealing chemical component source and the cable assembly, a second pump in operative communication with the catalyst component source and the cable assembly, a test valve in operative communication with the test fluid source and the cable assembly, and a control panel assembly having electronic circuits for setting and automatically controlling the timing and air pressure parameters of the packer device and to permit the automatic testing and sealing operations of the packer device. The control panel assembly further has electronic circuitry to control the packer device end element pressure, to control the testing and sealing pressures of the packer device sleeve member, and first and second pressure differential sensors to automatically control the activation of the first and second pumps for sealing purposes and to control the test valve for its testing purposes.

20 Claims, 9 Drawing Figures

ELECTRONIC TEST AND SEAL APPARATUS AND METHOD

BACKGROUND OF THE INVENTION

This invention relates to an apparatus and method for testing and sealing pipeline sections. Particularly, this invention relates to an electronic test and seal apparatus to automatically control the functions of an inflatable packer device from a remote location.

Inflatable packer devices have successfully been used in the pipeline construction and pipeline rehabilitation industries to test pipelines for leakage and to seal the portions where leakage occurs. One such inflatable packer device is described in U.S. Pat. No. 3,834,422 (Larson). Chemical sealants and hose assemblies have also been used in conjunction with these packer devices in pipeline testing and sealing operations as described in U.S. Pat. No. 4,572,228 (Larson, et al.). However, these packer devices and testing and sealing operations have required much operator input and control. The electronic test and seal apparatus of this invention provides the automatic control of the elements disclosed in these patent refereneces. And, as far as is known, an effective and reliable electronic automatic test and seal system for these elements has not been proposed or developed.

Due to developing environmental concerns, a need exists in the pipeline construction and maintenance industries for the reliable and repeatable testing of pipeline joints and for the reliable testing and sealing of breaks in pipeline sections. Particularly, a need exists to perform these functions reliably and automatically from a remote location; and to provide a test and seal system that permits the reliable and accurate control of a range of packer device sizes for use in a range of pipeline diameters and for use with a variety of chemical sealant components.

In the past, prior art control devices have been proposed and used in conjunction with inflatable packer devices. However, these devices have generally employed pneumatic controls which are subject to contamination due to dirt, dust and moisture and they have, therefore, been unreliable and problematic in operation.

The electronic test and seal system of this invention provides operator controls for pressure setting and timing cycles that are easy to set, control and monitor and which are easily adjustable to compensate for varying ground and soil conditions, pipeline conditions and pipeline diameters. Additionally, the automatic test and seal system provides the operator with means to easily adjust for the use of a range of packer device operating conditions and to accomodate for various sealing chemicals.

The invention also allows the operator to manually control any part of the automatic testing and sealing sequence and to control sealant cure times to compensate for existing temperature conditions.

The electronic test and seal apparatus and methods of this invention provide accurate, sensitive and repeatable automatic controls of the various operations and parameters of an inflatable packer device from a remote location.

SUMMARY OF THE INVENTION

The electronic test and seal apparatus and method of this invention provides an automatic pipeline testing and sealing system to operate an inflatable packer device of a predetermined diameter from a remote location. The packer device has inflatable end elements, an exterior sleeve member and a chemical dispensing mechanism. Further, the packer device is in operative communication with a cable assembly which has a sleeve air line, an end element air line, a sealing chemical line and a catalyst line, a compressed air source, a pressurized test fluid source, a sealing chemical component source, and a catalyst component source.

The automatic testing and sealing system is comprised of a first pump means, which is in operative communication with the sealing chemical component source and the sealing chemical line of the cable assembly. A second pump means is also provided and which is in operative communication with the catalyst component source and the catalyst line of the cable assembly. Further, a valve means is provided which is in operative communication with the test fluid source and catalyst line of the cable assembly, and a control panel assembly is provided, which has electronic circuits for setting and automatically controlling the timing and air pressure parameters of the packer device and which further permits the automatic testing and sealing operations of the packer device.

The control panel structure is further comprised of a pneumatic pressure monitoring means in communication with the sleeve airline of the cable assembly. A sleeve test pressure setting means, which is in selective communication with the sleeve air line of the cable assembly, is provided, as well as a sleeve seal pressure setting means in selective communication with the sleeve air line of the cable assembly.

The control panel structure also has an electronic circuitry for receiving and sending electrical signals. The electronic circuitry has a first pressure differential sensor to monitor the pressure differential between the actual sleeve pressure and the preset sleeve test pressure, and a second pressure differential sensor to monitor the pressure differential between the actual sleeve pressure and the preset sleeve seal pressure. The first and second differential sensors are for generating electrical signals for use in the remaining electronic circuitry.

The control panel structure circuitry further has an operator input circuit which is constructed and arranged to receive electrical inputs for predetermined time and pressure elements relating to the packer device. And, a logic section is provided, which is constructed and arranged to process the electrical signals generated from the first and second pressure differential sensors and the signals generated from the operator input circuit.

Further provided by the control panel structure of this invention is an output circuit which has solenoid coils used to control the valve means and the first and second pump means, whereby an operator is able to automatically control the test and seal functions of an inflatable packer device from a remote location.

Also provided by the electronic test and seal apparatus of the invention is control panel assembly circuitry to permit the manual control of the packer functions, preset inflation pressure controls for the packer end elements, and visual indicators to show the packer function sequencing steps.

These and other benefits of this invention will become clear from the following description, be reference to the drawings.

DESCRIPTION OF THE PREFERRED EMBODIMENT

Figure 1:
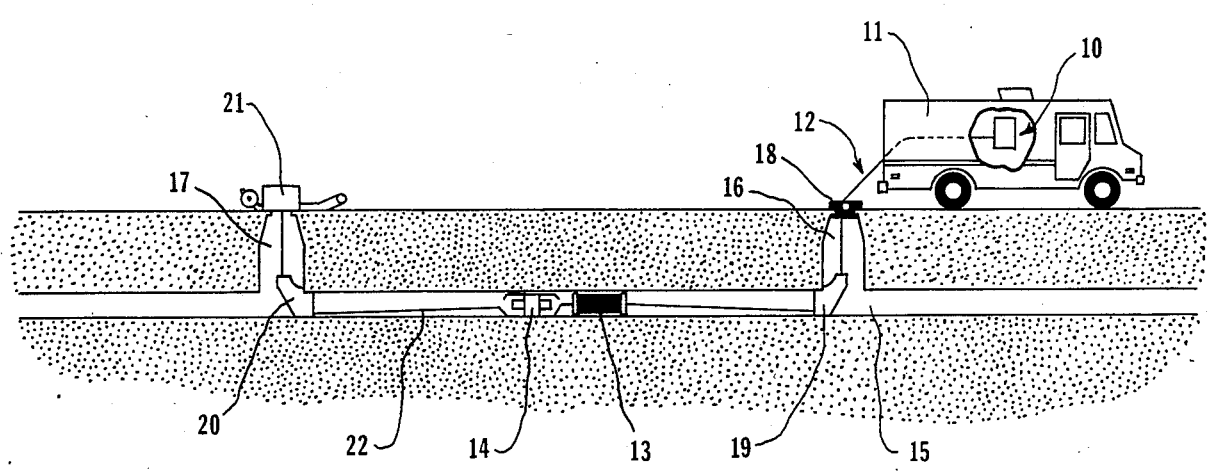
FIG. 1 is a schematic plan view which shows the electronic test and seal apparatus of this invention placed in a vehicle and showing it in use with an inflatable packer device in a sewer line for testing and repair purposes.

Referring to FIG. 1, a motorized vehicle or van 11 is shown at a site for testing and/or repairing a sewer line 15. The motorized vehicle or van 11 carries the required testing and sealing equipment, such as fluid input lines and chemical components; it provides the required electrical power and compressed air; and it houses the electronic test and seal apparatus 10 for activating and controlling the various testing and sealing operations of the inflatable packer device 13.

As is further shown in FIG. 1, a hose assembly 12 extends from the electronic test and seal apparatus 10 into a manhole entry 16 and is connected to the inflatable packer device 13. The winding and unwinding of the hose assembly 12 is facilitated by a surface roller assembly 18 and a manhole down roller assembly 19 located at manhole entry 16 and by a manhole down roller assembly 20 and a windup winch assembly 21 located at an adjacent manhole entry 17. A camera sled assembly 14, which is used to properly position the inflatable packer device 13 in sewer line 15, is attached to the inflatable packer device 13 and a tow cable 22 is operationally connected to windup winch assembly 21 to permit the operator in van 11 to control the location of inflatable packer device 13.

Figure 2:
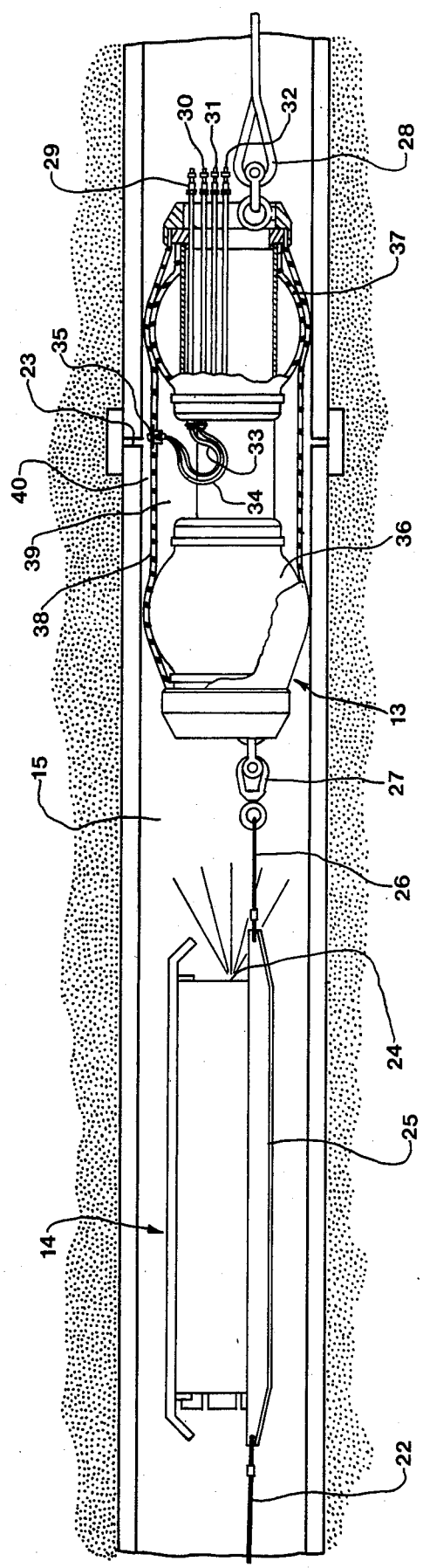
FIG. 2 is a schematic side plan view with cut-away portions which shows that inflatable packer device with a camera sled assembly positioned for testing and sealing a sewer line joint by the electronic test and seal apparatus of the invention.

FIG. 2 illustrates the inflatable packer device 13 positioned in sewer line 15 in proximity to a sewer line joint or visible fissure 23 for testing and sealing purposes. The inflatable packer device 13 is shown to have four input lines for its operation which consist of a sealing chemical line 29, chemical catalyst and test line 30, sleeve air line 31 and end element air line 32.

The inflatable packer device 13, as further described in U.S. Pat. No. 3,834,422 (Larson), has inflatable end elements 36 and 37 and an exterior sleeve 38. The end elements 36 and 37 inflate to fix the inflatable packer device 13 about sewer line joint 23 in sewer line 15, and the exterior sleeve 38 is inflated and monitored for the testing and sealing functions of the packer device 13. Sleeve air line 31 and end element air line 32 which are part of hose assembly 12 provide the compressed air for operating the inflatable packer device 13 and these inflating functions are controlled and monitored by the electronic test and seal apparatus 10 located in van 11.

The inflatable packer device 13 as shown in FIG. 2 is properly positioned at sewer line joint 23 by the operator in van 11 by means of camera sled assembly 14 having a sled body 25 and video camera 24. By viewing the position of the inflatable packer device 13 generated by camera 24, the operator can maneuver the inflatable packer device 13 position by means of the physical connections of connecting members 28, 27, 26 and tow cable 22.

Sealing chemical line 29 and chemical catalyst and test line 30 are likewise part of hose assembly 12 and are operationally connected, controlled and monitored by the electronic test and seal apparatus 10 in van 11. The inflatable packer device 13 has a dispensing valve structure 35 which communicates with sealing chemical line 29 and chemical catalyst and test line 30 by sealing chemical conduit 33 and catalyst and test conduit 34. The chemical components dispensed from dispensing valve structure 35 are forced and held in sewer line joint 23 by the inflation of exterior sleeve 38. Thus, the exterior void 40 can be monitored for test purposes and that space when filled with sealing chemical components can be injected into sewer line joint 23 by means of pressurizing the interior void 39 of packer device 13 which causes sleeve 38 to expand.

The chemical components utilized in the sealing process of the inflatable packer device 13 and controlled by the electronic test and seal apparatus 10 can be any two component sealing system, such as urethane, acrylamide, acrylite or similar grouting compounds.

Figure 3:
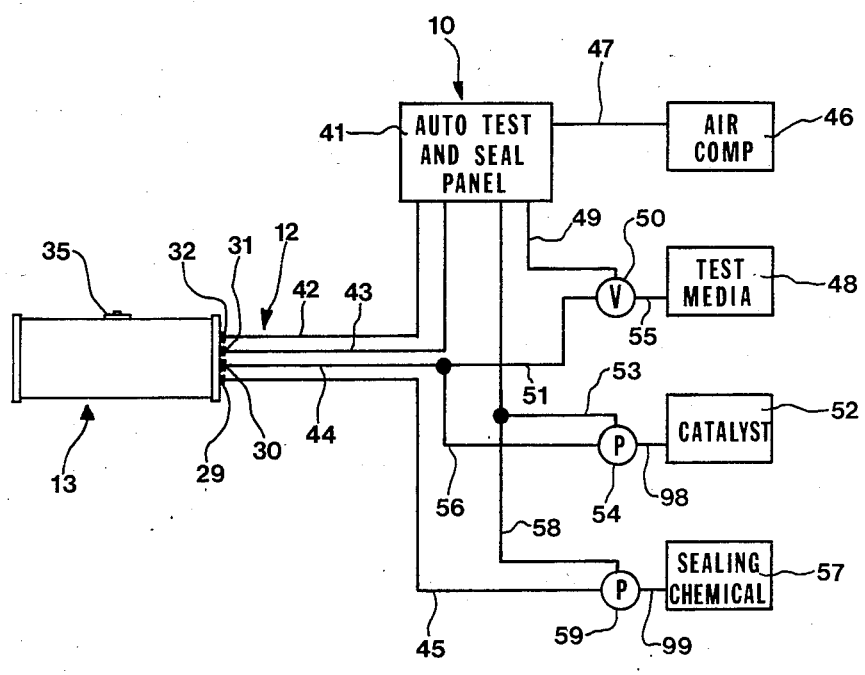
FIG. 3 is a schematic flow diagram which shows the various elements and method of testing and sealing a pipeline section utilizing an inflatable packer device and the electronic test and seal apparatus of the invention.

FIG. 3 shows a flow diagram that identifies the various elements of the automatic testing and sealing system of the invention and which shows the interaction and connection of the operational elements in the method or process of automatically testing and sealing a pipeline section. The process being controlled by the operator at the test and seal panel 41 located in van 11.

Referring to FIG. 3, the automatic test and seal panel 41 communicates with air compressor 46 via compressed air line 47 to supply compressed air to end element air line 32 and to sleeve air line 31 of the inflatable packer device 13 via end element air line hose 42 and sleeve compressed air line hose 43. The sleeve air line hose 43, as will be further discussed, is the air line hose which is monitored by the apparatus of this invention to automatically control the testing and sealing functions of packer 13. The automatic test and seal panel 41 further operationally communicates with test valve 50 via communication line 49. Valve 50 is in communication with test media supply source 48 via test media line 55 and test valve 50 further permits the test media fluid, such as water or air, to be supplied to chemical catalyst and test line 30 via test media line 51.

The automatic test and seal panel 41 also provides the simultaneous operation of pumps 54 and 59 via communication lines 53 and 58. Pumps 54 and 59 are in communication with catalyst supply 52 and chemical sealant supply 57 via catalyst line 98 and sealing chemical line 99 respectively, and they supply the sealing catalyst and chemical components to the chemical catalyst line 30 and sealing chemical line 29 via catalyst line 56, chemical catalyst and test fluid hose 44 and sealing chemical hose 45. Because chemical catalyst and test line 30 is used to receive the test media fluid from test media supply source 48 and the chemical catalyst from catalyst supply source 52 during the testing and sealing operations, which are separate and distinct operations of the inflatable packer device 13 as controlled by test valve 50 and pump 54, test media line 51 and catalyst line 56 are interconnected to supply line 30 by means of hose 44.

The electronic automatic test and seal apparatus 10 and method, operating through solid state controlled circuitry, automatically and reliably controls the test, seal and cure functions of the inflatable packer device 13 when used in conjunction with the various sewer line rehabilitation equipment components discussed with respect to the flow diagram of FIG. 3. The electronically operated, automatic test and seal panel 41, as shown in FIG. 4, is mounted in a chassis mount cabinet located in van 11, as discussed with respect to FIGS. 1 and 3.

Figure 4:
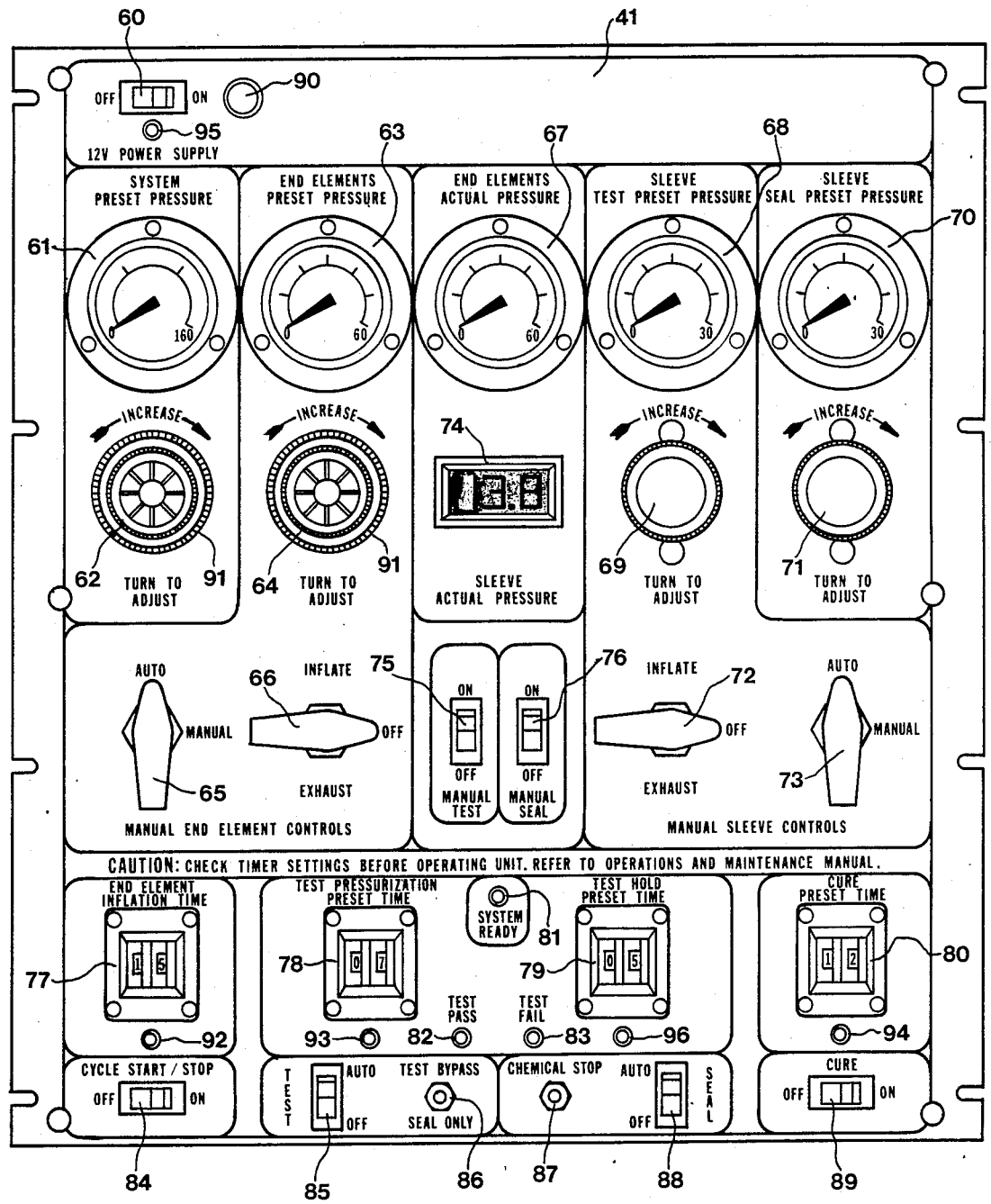
FIG. 4 is a frontal plan view of the control panel of the electronic test and seal apparatus of the invention.

Referring to FIG. 4, the panel 41 has a 12 volt power supply switch 60 for switching a 12 volt d.c. current to "on" and "off" positions. An indicator light 95 illuminates green when the power switch is in the "on" position. The panel 41 is further provided with a 3.5 amp safety fuse 90 to protect the electronic circuites of the automatic test and seal apparatus from excessive current during its operation. A system preset pressure gauge 61 shows the system supplied air pressure derived from the air compressor 46 and which is used for the pneumatic functions of the packer device. Typically, the system preset regulator 62 is adjusted to 80 psig, and the the system pressure may be increased or decreased by turning the regulator control knob 62 in a clockwise or counterclockwise direction. The panel 41 further has an end elements preset pressure gauge 63 that displays the preset air pressure to which the end elements of the packer are inflated. The end element preset pressure is increased or decreased by turning the regulator control knob 64 in a clockwise or counterclockwise direction. The regulation control knob 64, as well as the knob 62, can be locked in place by using locking rings 91. An end elements actual pressure gauge 67 displays the actual air pressure of the end elements 36 and 37 of packer 13.

The panel 41 is also provided with a sleeve test preset pressure gauge 68 which shows the preset sleeve pressure of the packer device and which is used for its testing function. A sleeve seal preset pressure gauge 70 displays the pressure reading at which the chemical sealant is forced into the sewer line joint or other visible problem area by the sleeve 38 during the sealing function of packer 13. Typically, the sleeve seal preset pressure gauge 70 is set at 4 to 5 psig higher than the sleeve test preset pressure gauge 68 (typically 15 psig maximum).

The regulator control knobs 69 and 71 for both the sleeve test preset and sleeve seal preset pressure gauges 68 and 70 may be set and locked at a desired setting by turning jam nuts that are located on their respective threaded regulator control shafts.

The panel 41 is further provided with an actual sleeve pressure digital readout 74 which displays the actual pressure on sleeve 38. It is this pressure which is monitored through line 43 that is used by the electronic test and seal apparatus to control the packer 13 functions. The sleeve pressure is displayed in "psig" to the nearest tenth and for international use, the pressure is displayed in "bars" to the nearest hundredth.

An auto/manual control valve 65 is further provided to allow for either manual or automatic inflation of the packer device end elements 36 and 37. The "inflate/off-/exhaust" control valve 66 permits manual control for the end element air pressure. Specifically, the "inflate" position fills the end elements with air, the "off" position permits the air pressure to hold in the end elements and the "exhaust" position will deflate the end elements.

Further provided by the electronic auto test and seal panel 41 of this invention is a manual test on/off switch 75. By placing switch 75 in the "on" position, the test valve 50 is opened to initiate the performance of an air/water test function. Also, by placing the manual seal on/off switch 76 in the "on" position, the chemical and catalyst pumps 54 and 59 will initiate the pumping of chemical sealant and catalyst through the sleeve packer dispensing valve structure 35 and into pipe joint 23. The "auto/manual" control valve 73 allows for either manual or automatic inflation of the packer sleeve. The "inflate/exhaust" control valve 72 permits the manual control of the packer sleeve pressure. Specifically, the "inflate" position fills the sleeve with air, the "off" position permits the holding of sleeve air pressure, and the "exhaust" position causes the deflating of the packer sleeve.

The panel 41 is also provided with an end element inflation timer 77 which controls the length of time air at system preset pressure (fast inflate mode) is supplied to the packer end elements. The length of time is set according to the size of the sleeve packer device being used. An indicator light 92 illuminates to show the operator when the timer is actuated. A test pressurization preset timer 78 controls the length of time the test or air supply valve 50 remains open to pressurize the joint area during the testing function; and the test hold preset timer 79 controls the length of time the pipeline joint being tested must hold air pressure. Further provided by the electronic auto test and seal panel 41 of this invention is a cure preset timer 80, which indicates the amount of time for the sealant to cure. Each manufacturer recommends various and differing specific sealant cure times depending upon its chemical formulation. Indicator lights 93, 96 and 94 show the operator when the functions associated with timers 78, 79 and 80 are operational.

The control panel 41 has a system ready light 81 which illuminates when the system is ready for operation. Further, it has a test pass light indicator 82 which illuminates green when the pipeline joint being tested holds the test media introduced. If the joint being tested fails the test, "test fail" light 83 will illuminate red.

The automatic test and seal control functions will begin operation when the "cycle start/(emergency) stop" switch 84 is placed in the "on" position. By placing the switch 84 in the "off" position, the cycle sequence will immediately stop and exhaust the pneumatic packer device. Similarly, by placing the test "auto/off" switch 85 in the "auto" position, the joint testing process takes place during the automatic operation sequence. And, a "seal auto/off" switch 88 is provided to allow the joint sealing process to take place during the operation cycle when switched to the "auto" position. A cure "on/off" switch 89 allows proper chemical cure times during the automatic operation cycle when placed in the "on" position. The user of the panel 41 refers to the chemical manufacturer specifications for setting proper cure times at time control 80.

The panel 41 is further provided with a "test by-pass, seal only" switch 86, which enables the user to automatically bypass the test cycle and/or to advance the process into the sealing cycle by pressing button 86 while the test valve is operational. And, by pressing the "chemical stop" switch button 87 while the chemical and catalyst pumps are in operation, the pumps will automatically stop pumping sealant into the pipeline joint, and will advance the operational cycle to the cure mode.

OPERATION

Figure 5:
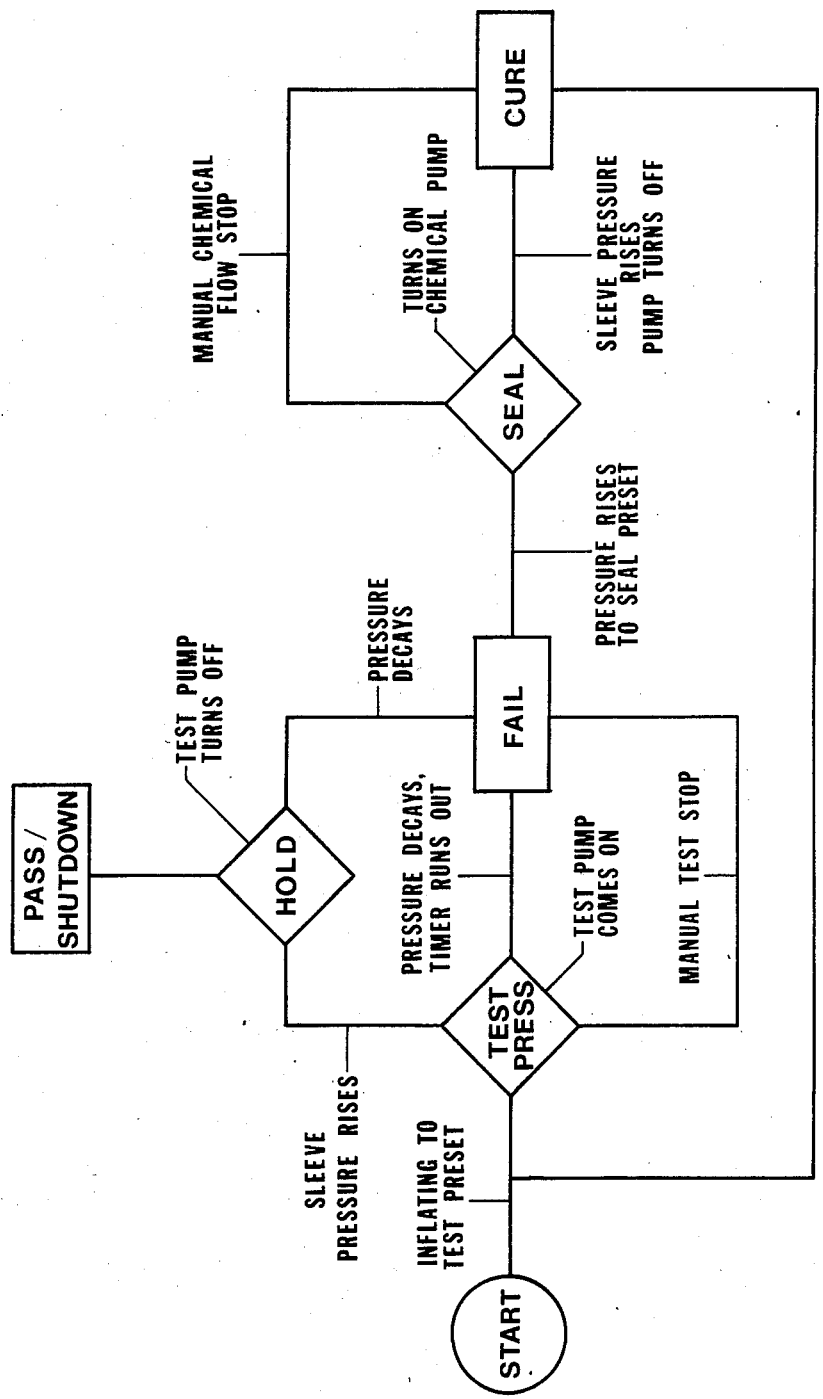
FIG. 5 is a schematic flow diagram which illustrates the process of testing and sealing a pipeline section utilizing the electronic test and seal apparatus of the invention.

With reference to FIG. 4 and the operational flow diagram of the process shown in FIG. 5, the operational steps involving the automatic test and seal apparatus will now be described.

Before operating the automatic test and seal apparatus, all switches on the control panel 41 are initially placed in the "off" W position. The system control regulator knob 62 is turned fully counterclockwise (or to "0" psig on the pressure gauge 61).

To start the operation of the apparatus in automatic control, it is necessary to first place the manual end element "auto/manual" control valve 65 into the "auto" position, and the manual sleeve "auto/manual" control valve 73 is placed into the "auto" position.

Next, the air compressor 46 is turned on to enable full pressurization, which should not exceed 120 psig (8.2 Bar). The system preset regulator 62 is adjusted to achieve a reading of 80 psig on the system preset pressure gauge 61, and the current size sleeve packer 13 is selected according to the diameter of the pipeline to be tested. The sleeve packer 13 is then connected to the chemical reel chemical line or hose assembly 12 and placed inside the pipeline 15 over a pipe joint 23 or other suspected problem area.

The end element preset regulator 64 is then adjusted to achieve an end element pressure gauge 67 reading in accordance with the sleeve packer 13 size being used. The sleeve test preset regulator 69 is adjusted to achieve a seal preset gauge 68 reading comparable to the size sleeve packer 13 being used; the sleeve seal preset pressure must be 4 to 5 psig higher than the sleeve test preset pressure (15 psig maximum). Then, the sleeve seal preset regulator 71 is adjusted to achieve a test preset pressure gauge 70 reading in accordance with the size sleeve packer 13 being used. For example, a packer device selected for use in an 8-10 inch diameter pipeline section may use an end element inflation pressure of 35 psig, a sleeve sealing preset inflation pressure of 15 psig and a sleeve test preset inflation pressure of 10 psig. Corresponding pressure settings for a 24-30 inch diameter pipeline section may use 25, 12 and 7 psig pressures respectively.

Next, both manual test and seal "on/off" switches 75 and 76 are placed in the "off" position, and the 12 volt power supply switch 60 is placed in the "on" position.

The end element inflation timer 77, the test pressurization preset timer 78, the test hold preset timer 79 and the cure timer 80 are then set at their respective desired settings, and the auto test and seal switches 85 and 88 are placed in the "auto" position. For example, when an 8-10 inch diameter packer device is placed in a 10 inch diameter pipeline section, the fast inflate end element timer 77 is set at 8 seconds. For larger packer devices, the end element timer 77 is gradually increased. The cure switch 89 is further placed in the "on" position.

As previously discussed, either air or a liquid, such as water, can be utilized as the test fluid media. If a system is provided wherein either air or water can be utilized for the test fluid media, an air/water test valve assembly (not shown) is provided in the test and seal system. In the latter case, at this point in the process, the desired test media is selected by placing the three-way valve in the correct operating position.

Before placing the 12 volt power supply switch 60 on the control panel 41 into the "on" position, the "cycle start/emergency stop" switch 84 must be in the "off" position. The 12 volt power supply switch 60 is placed in the "on" position, after which the system ready light 81 will illuminate. After allowing the electronic auto test and seal apparatus and method to warm up for several minutes, and after ensuring that all system preset regulators and timers are properly set, the cycle start/emergency stop switch 84 is placed in the "on" position to start the automatic cycling sequence of the apparatus. The system ready light 81 will shut off as the packer end elements 36 and 37 and sleeve 38 being inflating. The end elements 36 and 37 will fast inflate for the length of time that the end element inflation timer 77 is set and will then continue to inflate at a slower rate until the end element preset pressure, as set on gauge 63, is achieved. As previously discussed, fast inflate end element inflation times are based on the size of the packer device 13.

Once the packer end elements 36 and 37 and sleeve 38 are at the desired preset pressures, the test pressurization preset timer indicator light 93 will come on, and test valve 50 is activated or opened and test pressurization of the pipeline joint will begin. When the system sequence is in the test pressurization mode, three possible functions may occur because of the automatic test and seal system.

First, if there is an 0.4 to 0.6 psig rise in actual sleeve pressure, the test pressurization indicator light 93 will turn off and the test hold preset timer 79 will activate to shut off valve 50. The test hold preset timer 79 will hold for the desired amount of time, and if there is no more than 0.4-0.6 psig pressure loss, the "test pass" indicator light 82 will illuminate. The cycle switch 84 is then placed in the "off" position. The pipeline joint has passed the air/water test and the sleeve packer 13 can be moved to the next joint or pipeline area to be tested.

Secondly, if there is an 0.4 to 0.6 psig rise in actual sleeve pressure, the test pressurization indicator light 93 will shut off and the test hold preset timer 79 will activate to shut off test valve 50. The test hold preset timer 79 will hold for the preset time, but if the sleeve pressure decays, the "test fail" indicator light 83 will illuminate. The test and seal system will then automatically begin the seal cycle.

Once the pipe joint 23 is sealed and passes the air/water test, the cycle start/emergency stop switch 84 is placed in the "off" position and the sleeve packer 13 is moved to the next joint to be tested.

Finally, if there is no rise in sleeve air pressure when the test pressurization timer 78 stops, the test valve 50 and test pressurization indicator 93 will shut off and the "test fail" indicator light 83 will illuminate. The packer device 13 will then automatically inflate to the seal preset pressure (gauge 70) and the chemical sealant and catalyst pumps 54 and 59 will start pumping. The pumps will continue operating until the sleeve seal pressure as shown on gauge 74 increases by 0.1–0.3 psig. When this pressure rise is obtained, the pumps 54 and 59 will shut off and the cure preset time indicator light 94 will illuminate to signal the start of the cure cycle.

If no pressure rise is detected indicating that the problem area is too large to be effectively sealed with one injection of sealant, the catalyst and chemical pumps 54 and 59 can be stopped by pressing the chemical stop button 87. The operation cycle will go directly into the cure mode, temporarily stop, and then begin the testing sequence again.

When the cure cycle temporarily stops, the test fail and cure preset time indicator lights 83 and 94 will turn off. The sleeve 38 will deflate and the system cycle test procedure will begin testing the joint again if desired.

Figure 6:
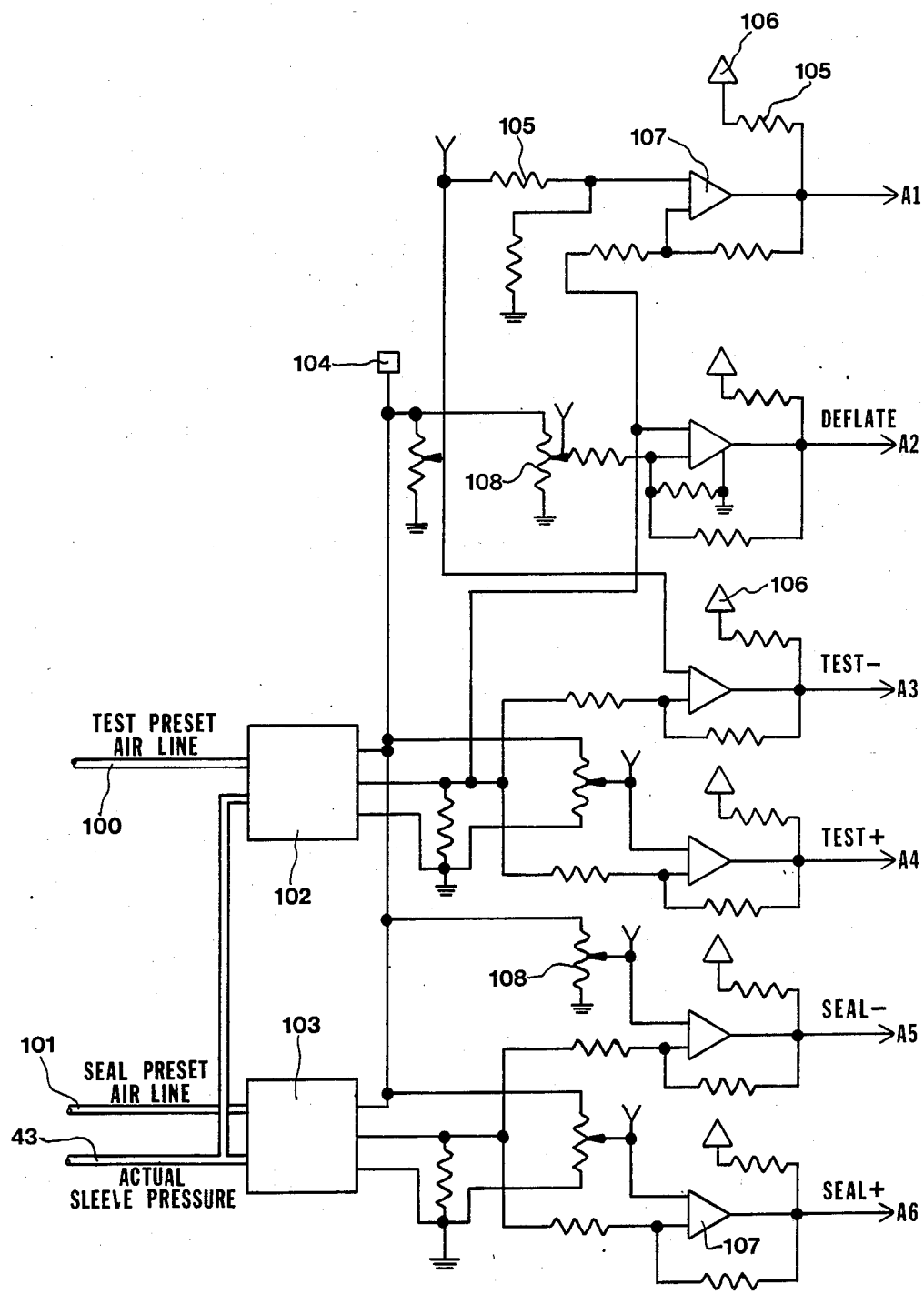
FIG. 6 is a schematic circuit diagram showing the pneumatic input section or the interface between the pneumatic and electronic elements of the circuitry of the invention.

FIGS. 6 through 9 show the circuit diagrams of the electronic testing and sealing system of the invention. The four circuit diagrams shown in these drawing figures are all interconnected and are individually shown merely due to space restriction and for discussion of their respective functions. For example, the output designations A1–A6 shown at the right of FIG. 6 are similarly shown as input designations A1–A6 at the left of FIG. 8. Similar input and output designations are utilized to show the interconnection of the circuit diagrams of FIGS. 6 through 9.

FIG. 6 shows the input section or portion of the electronic circuit of the automatic test and seal system. This section of the total circuitry shows the input signals to the circuit and it shows the interface or conversion of pneumatic pressure to electric signals used in the electronic circuitry. The circuit shows three pneumatic or airline pressure inputs connected to pressure differential sensors 102 and 103. Pressure sensor 102 receives the preset test air line 100 as regulated by 69 and the actual sleeve pressure line 43 and pressure sensor 103 receives the preset seal air line 101 as regulated by 71. and also the actual sleeve pressure line 43. By means of the pressure differential sensors 102 and 103, the pneumatic or line pressures are converted into electrical signals for use in the remaining circuitry. As further shown in FIG. 6, the circuitry consisting of a 12 volt supply source 104, resistors 105, 5 volt supplies 106, inverters or differential devices 107 and variable resistors 108 for factory sensitivity settings are utilized to generate 6 possible signals designated A1 through A6. The signal A1 represents the "system ready" signal where the actual sleeve pressure is at zero psig. Signal A2 represents a shutdown or deflate signal causing the sleeve pressure to return to zero psig. A3 represents a signal where the test pressure of the sleeve equals the preset sleeve pressure; A4 represents a sleeve test pressure rise signal; A5 represents a sleeve sealing pressure equal to the sleeve preset seal pressure; and A6 represents a sleeve seal pressure rise signal. In summary, the A1 signal is initially required for the automatic cycle of the test and seal system and the circuitry as shown in FIG. 6 represents the interface or conversion of pneumatic or pressure values to digital signals for processing in the circuit diagram shown in FIG. 8.

Figure 7:
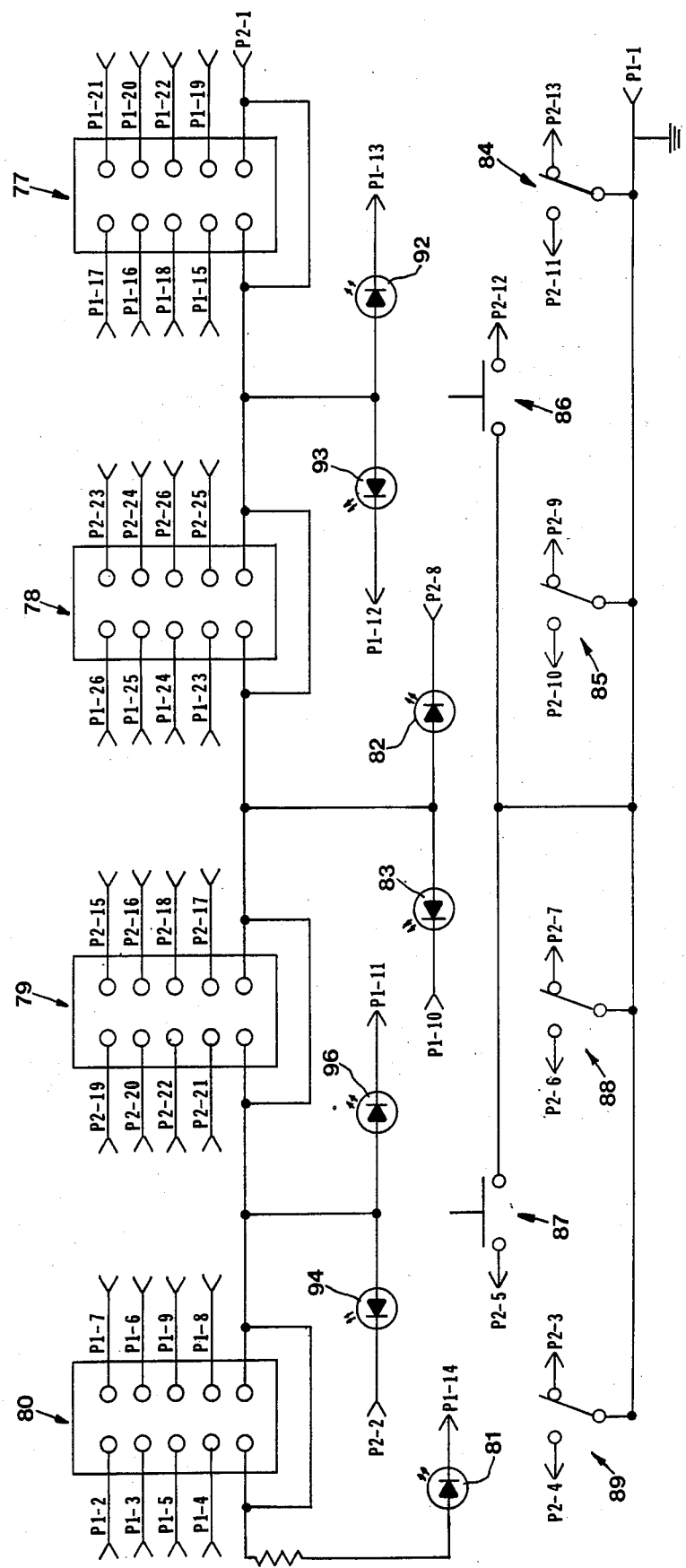
FIG. 7 is a schematic circuit diagram showing the electrical parameter inputs for the packer device by the operator of the control panel of FIG. 4.

FIG. 7 shows the electrical input parameters for the packer device that are introduced by the operator at control panel 41 for electronic processing. With reference to FIG. 4, the thumb wheel time setting switches for the end element inflation time 77, preset test pressurization time 78, preset test holding time 79 and the preset cure time 80 are shown in the operator input circuitry. Further, the cycle start/stop switch 84, the auto/off test function bypass switch 85, the test bypass or seal function only switch 86, the chemical stop switch 87, the seal auto/off or seal function bypass switch 88 and the cure cycle on/off switch 89 are shown introduced to the circuit diagram. The control panel cycle sequence light indicators 81, 94, 96, 83, 82, 93 and 92 are shown in the circuit diagram and which are connected to function for purposes of visually showing the operator located in van 11 at which step of the testing and sealing cycle the pneumatic plug device 13 is functioning.

Figure 8:
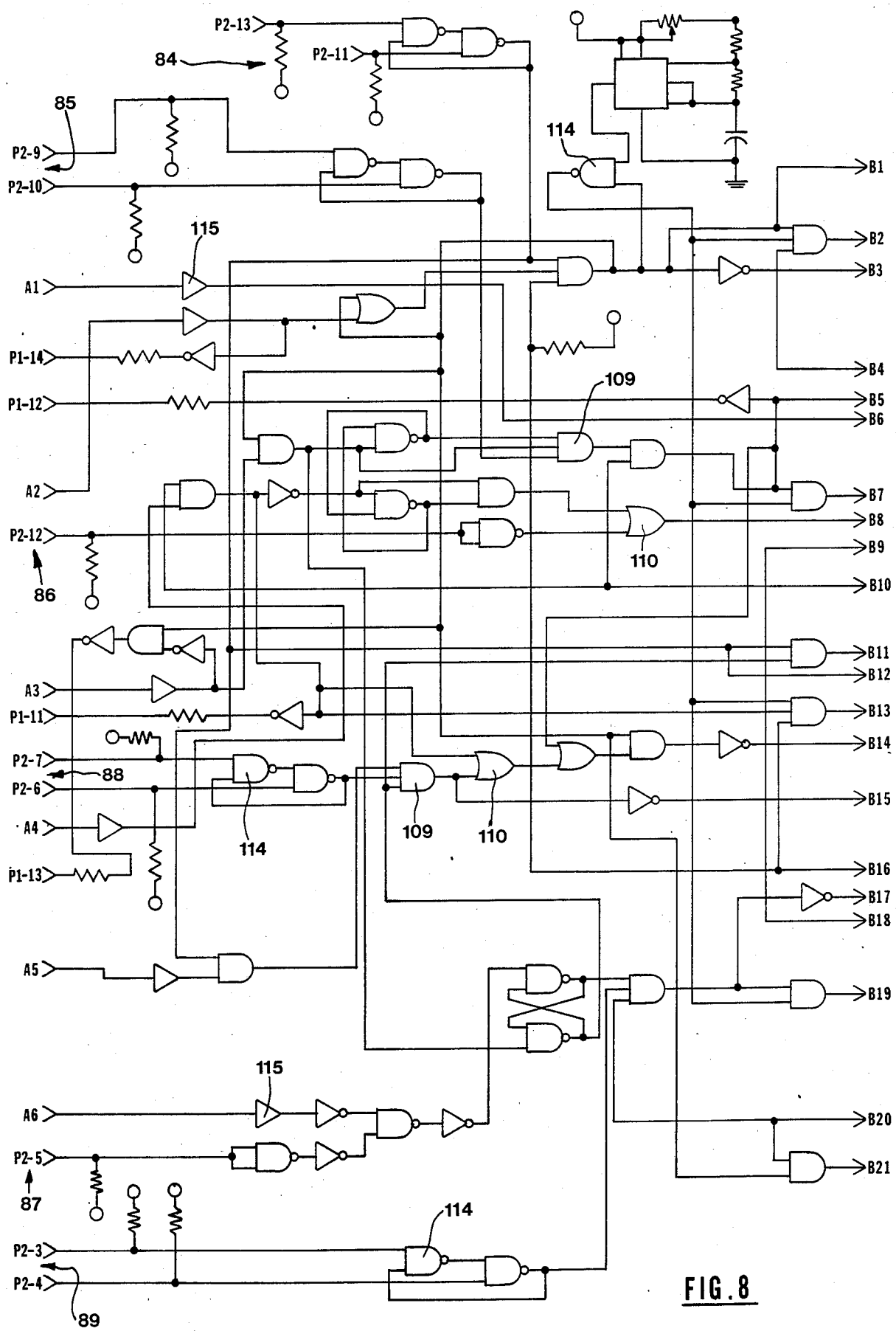
FIG. 8 is a schematic circuit diagram of the logic section of the automatic test and seal system circuitry of the invention.

FIG. 8 shows the logic section or signal processing section of the automatic test and seal system circuitry. The schematic diagram shows the operator signal inputs 84 through 89 discussed with respect to FIG. 7 as well as the A1–A6 signals of FIG. 6. These signals are processed via the use of 3 input AND gates 109, OR gates 110, 2 input NAND gates 114 and buffers or inverters 115 to yield signals B1–B21 which correspond with the same B1–B21 designations shown in FIG. 9.

Figure 9:
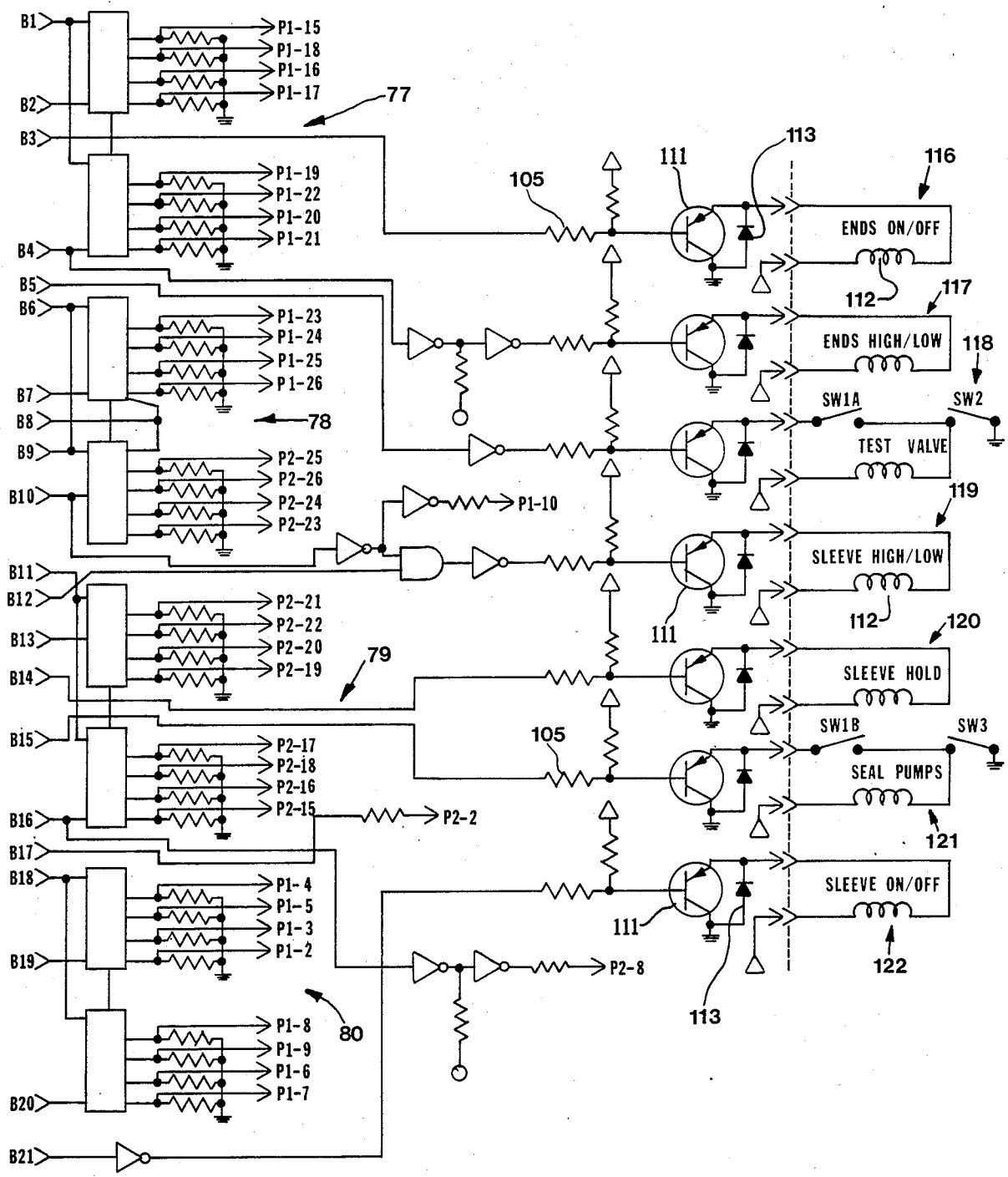
FIG. 9 is a schematic circuit diagram of the timing control inputs and the electrical output section of the automatic test and seal system circuitry of this invention.

FIG. 9, which also shows the operator timing control inputs 77–80 discussed with respect to FIG. 7, illustrates the output section of the automatic test and seal system circuitry. The output circuitry having power transistors 111, diodes 113 and resistors 105 activate solenoid coils 112 to control the various packer device functions. Output 116 controls the on/off of the end element air line; output 117 controls the fast inflation (high) by system preset air and regulated air or preset end element air (low) to the end elements; output 118 controls the test media control valve 50; output 119 controls the sleeve high and low settings (the low setting is controlled by the sleeve test preset pressure as adjusted by air regulator 69 and shown on gauge 68, and the high pressure is controlled by the sleeve seal preset pressure as adjusted by regulator 71 and shown on gauge 70); output 120 is a sleeve holding function (time delay); output 121 controls pumps 54 and 59; and output 122 controls the on/off of the sleeve elements. The outputs 119, 120 and 122 are operationally interconnected and interrelated.

In summary, as discussed previously with respect to the operation of the automatic functions of the packer device 13 and with respect to FIG. 4 of the timing and pneumatic presets and related function controls by the operator at control panel 41, the electronic circuitry of FIGS. 6 through 9 processes these pneumatic and electrical inputs to yield outputs 116 through 122 to automatically control the end elements and the sleeve element of the packer device as well as the operation of the test valve 50 and the chemical sealant component and catalyst pumps 54 and 59.

Although FIGS. 6–9 illustrate the use of specific electronic components, similar components, as known in the electronic art, or a programmable controller or processing unit can also be utilized so long as the pneumatic pressure inputs and operator inputs are processed to yield electric output signals to automatically control the testing and sealing functions of the packer device.

As many changes are possible to the embodiments of this invention, utilizing the teachings thereof, the description above, and the accompanying drawings, That which is claimed is:

1. An automatic electronically operated control and monitoring device for a pipeline testing and sealing system to operate an inflatable packer device of a predetermined diameter from a remote location, the packer device having inflatable end elements, an exterior sleeve member and a chemical dispensing mechanism and being in operative communication with a cable assembly having a sleeve air line, an end element airline, a sealing chemical line and a catalyst line, a compressed air source, a pressurized test fluid source, a sealing chemical component source, and a catalyst component source, said automatic testing and sealing system comprising:
   a. first pump means in operative communication with the sealing chemical component source and the sealing chemical line of the cable assembly,
   b. second pump means in operative communication with the catalyst component source and the catalyst line of the cable assembly,
   c. valve means in operative communication with the test fluid source and catalyst line of the cable assembly, and
   d. a control panel assembly having pneumatic pressure monitoring means in communication with the sleeve airline of the cable assembly, sleeve test pressure presetting means in selective communication with the sleeve airline of the cable assembly, sleeve seal pressure presetting means in selective communication with the sleeve airline of the cable assembly, a preset operator input circuit constructed and arranged to receive electrical inputs for predetermined time elements relating to the packer device, and having electronic circuits yielding only electrical output signals for automatically setting and controlling the timing and air pressure parameters of the packer device and to permit the automatic testing and sealing operations of the packer device from a remote location, said control panel structure further comprising:
      (1) an electronic circuit having a first pressure differential sensor to monitor the pressure difference between the actual sleeve pressure and the preset sleeve test pressure and a second pressure differential sensor to monitor the pressure difference between the actual sleeve pressure and the preset sleeve seal pressure, said first and second differential sensor for generating electrical signals,
      (2) an electronic logic section constructed and arranged to process the electrical signals generated from said first and second pressure differential sensors and the signals generated from the operator input circuit, and
      (3) an output circuit having solenoid coils to control the valve means and the first and second pump means, whereby an operator is able to automatically control the test and seal functions of an inflatable packer device from a remote location.

2. The automatic pipeline testing and sealing system of claim 1, wherein said control panel assembly additionally has electronic circuitry to override the automatic testing and sealing cycles, whereby the operator is able to manually control the test and seal function of the packer.

3. The automatic pipeline testing and sealing system of claim 1, wherein said control panel assembly additionally has preset pressure controls for the end elements of the packer device and wherein said control includes a fast inflate cycle.

4. The automatic pipeline testing and sealing system of claim 1, wherein said control panel structure additionally has time controls for the end element system preset pressure inflation, sleeve test pressurization, sleeve test pressure holding and sleeve pressure holding during chemical curing.

5. The automatic pipeline testing and sealing system of claim 1, wherein said control panel assembly has electronic circuitry to permit the bypass of the testing and sealing cycles.

6. The automatic pipeline testing and sealing system of claim 1, wherein said control panel assembly has visual indicators to show system pressure, end element pressure, actual sleeve test pressure, test fail and test pass.

7. The automatic pipeline testing and sealing system of claim 2, wherein said control panel assembly additionally has a manually operated inflate, exhaust and air pressure hold switch for end element inflation control and a manually operated inflate, exhaust and air pressure hold switch for sleeve element inflation control.

8. An automatic, electronically operated control and monitoring pipeline testing system to operate an inflatable packer device of a predetermined diameter from a remote location, the packer device having inflatable end elements, an exterior sleeve member and being in operative communication with a cable assembly having a sleeve air line, an end element airline, a compressed air source, and a test fluid source, said automatic testing system comprising:
   a. valve means in operative communication with the test fluid source and the catalyst line of the cable assembly, and
   b. a control panel structure having pneumatic pressure monitoring means in communication with the sleeve airline of the cable assembly, sleeve test pressure presetting means in selective communication with the sleeve airline of the cable assemly, a preset operator input circuit constructed and arranged to receive electrical inputs for predetermined time elements relating to the packer device, and having electronic circuits yielding only electrical output signals for automatically setting and controlling the timing and air pressure parameters of the packer device to permit the automatic testing operation of the packer device from a remote location, said control panel structure further comprising:
      (1) an electronic circuit having a pressure differential sensor to monitor the pressure difference between the actual sleeve pressure and the preset sleeve test pressure, said differential sensor for generating electrical signals,
      (2) an electronic logic section constructed and arranged to process the electrical signals generated from said pressure differential sensor and the signals generated from the operator input circuit, and
      (3) an output circuit having solenoid coils to control the valve means, whereby an operator is able to automatically control the test function of an inflatable packer device from a remote location.

9. An automatic, electronically operated control and monitoring pipeline sealing system to operate an inflatable packer device of a predetermined diameter from a remote location, the packer device having inflatable end elements, an exterior sleeve member and a chemical dispensing mechanism and being in operative communication with a cable assembly having a sleeve air line, an end element airline, a sealing chemical line and a catalyst line, a compressed air source, a sealing chemical component source, and a catalyst component source, said automatic testing and sealing system comprising:
 a. first pump means in operative communication with the sealing chemical component source and the sealing chemical line of the cable assembly,
 b. second pump means in operative communication with the catalyst component source and the catalyst line of the cable assembly, and
 c. a control panel structure having pneumatic pressure monitoring means in communication with the sleeve airline of the cable assembly, sleeve seal pressure presetting means in selective communication with the sleeve airline of the cable assembly, a preset operator input circuit constructed and arranged to receive electrical inputs for predetermined time elements relating to the packer device, and having electronic circuits yielding only electrical output signals for automatically setting and controlling the timing and air pressure parameters of the packer device to permit the automatic sealing operation of the packer device from a remote location, said control panel structure further comprising:
  (1) an electronic circuit having a pressure differential sensor to monitor the pressure difference between the actual sleeve pressure and the preset sleeve seal pressure, said differential sensor for generating electrical signals,
  (2) an electronic logic section constructed and arranged to process the electrical signals generated from differential sensor and the signals generated from the operator input circuit, and
  (3) an output circuit having solenoid coils to control the first and second pump means, whereby an operator is able to automatically control the seal function of an inflatable packer device from a remote location.

10. An electronic test and seal system for automatically operating an inflatable packer device of a predetermined size from a remote location to test a pipeline section for leakage at predetermined parameters and to automatically seal any leakage found, the electronic test and seal system for use with an inflatable packer device having end elements, an exterior sleeve, and a chemical dispensing mechanism, a cable assembly having end element, sleeve, sealing chemical and catalyst lines in operative communication with the inflatable packer device, an air compressor, a pressurized fluid source, a sealing chemical component source, and a catalyst component source, said electronic test and seal system comprising:
 a. an electronically operated control panel assembly in communication with the inflatable packer device and the cable assembly, said control panel assembly further having:
  (1) end preset element pressure setting control means,
  (2) end element inflation time control means,
  (3) sleeve preset test pressure control means,
  (4) sleeve preset seal pressure control means,
  (5) sleeve test pressurization time control means,
  (6) sleeve test pressurization time holding means, and
  (7) sealing chemical curing time control means;
 b. valve means located between the pressurized test media source and the packer device and being automatically controlled at said panel structure;
 c. first pump means located between the sealing chemical component and the packer device and being automatically controlled at said panel structure;
 d. second pump means located between the catalyst component source and the packer device and being automatically controlled at the same time as said first pump means at said panel structure; and
 e. electronic means to yield only electrical output signals in communication with said pneumatic sleeve line and having pressure differential sensing means to monitor said sleeve line pressure and being in communication with said sleeve preset test and sleeve preset seal pressure control means, and being in communication with said valve means and said first and second pump means, whereby presetting the pressure and time parameters at said electronic panel structure permits a pipeline section to be automatically tested and sealed from a remote location by the electrical output signals.

11. The electronic test and seal system of claim 10, wherein said panel control assembly additionally has manual override means.

12. The electronic test and seal system of claim 10, wherein said panel control assembly additionally has end element preset pressure, sleeve test preset pressure and end element actual pressure and sleeve element actual pressure readout means.

13. The electronic test and seal system of claim 10, wherein said panel control assembly additionally has means to bypass the testing cycle and means to bypass the sealing cycle.

14. The electronic test and seal system of claim 10, wherein said panel control assembly additionally has visual indicators for showing test pass and test fail.

15. The electronic test and seal system of claim 10, wherein said panel control assembly additionally has sealing chemical stop means.

16. A method for automatically testing and sealing a pipeline seaction of a predetermined diameter from a remote location comprising:
 a. providing an inflatable packer device of a predetermined size, the packer device having inflatable end elements, an exterior sleeve member, a chemical dispensing mechanism and having hose assembly connecting means,
 b. providing a compressed air source, a pressurized test fluid source, a sealing chemical source and a catalyst source,
 c. providing a hose assembly having a packer sleeve air line, an end element air line, a catalyst and test fluid line and a chemical sealant line,
 d. providing a first pump means in operative communication with the sealing chemical component source and the chemical sealant line, a second pump in operative communication with the catalyst source and the catalyst and test fluid line and a valve in operative communication with the test fluid source and the catalyst and test fluid line at a location beyond the second pump, e. providing an electronically operated control panel in operative communication with the compressed air source, the sleeve air line, the end element air line, the valve and the first and second pumps, said control panel further having pneumatic pressure monitoring means in communication with the packer sleeve air line and having a first regulator means to preset the pneumatic test pressure for the packer sleeve and a second regulator means to preset the pneumatic seal pressure for the packer sleeve, said electronic control panel further having electronic circuitry to yield only electrical output signals including a first pressure differential sensor to monitor the pressure difference between the actual sleeve pressure and the preset test pressure and a second pressure differential sensor to monitor the difference between the actual sleeve pressure and the preset sleeve pressure, f. setting the first and second pressure regulator means for the selected packer device and for the diameter of the pipeline section diameter, and g. turning the electronic control panel to its operative position whereby the testing and sealing functions of the packer device are automatically controlled by the electrical output signals operative on the valve and the first and second pump means.

17. The method of claim 16, wherein said control panel assembly is additionally provided with operator control means for the input of end element fast inflation time, test pressurization time, sleeve test holding time and chemical cure time.

18. The method of claim 16, wherein said control panel assembly is additionally provided with operator control means to manually control the inflation, hold and exhaust for the end elements and means to manually control the inflation, hold and exhaust for the sleeve element.

19. The method of claim 16, wherein said control panel assembly is additionally provided with operator control means to select only automatic testing and automatic sealing function of the packer device.

20. The method of claim 16, wherein said control panel assembly is additionally provided with gauges to show the preset system air pressure, the end element preset air pressure, the sleeve test preset pressure, the sleeve seal preset pressure and the actual sleeve pressure, and wherein said control panel assembly has cycle sequence indicator lights to show end element inflation, sleeve test pressurization, sleeve test holding, sleeve cure holding, system ready, test pass and test fail.

* * * * *